(12) United States Patent
Aoki et al.

(10) Patent No.: US 11,515,814 B2
(45) Date of Patent: Nov. 29, 2022

(54) MOTOR DRIVE CONTROL DEVICE AND METHOD FOR CONTROLLING THE SAME

(71) Applicant: MINEBEA MITSUMI Inc., Nagano (JP)

(72) Inventors: Masato Aoki, Iwata (JP); Takahiro Suzuki, Fukuroi (JP); Tomotaka Sakuma, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/491,598

(22) Filed: Oct. 1, 2021

(65) Prior Publication Data

US 2022/0109388 A1 Apr. 7, 2022

(30) Foreign Application Priority Data

Oct. 6, 2020 (JP) .............................. JP2020-169234

(51) Int. Cl.
*F25D 25/02* (2006.01)
*H02P 6/16* (2016.01)

(52) U.S. Cl.
CPC ..................................... *H02P 6/16* (2013.01)

(58) Field of Classification Search
CPC ........... F25D 25/025; H02P 6/16; H02P 27/08
See application file for complete search history.

(56) References Cited

U.S. PATENT DOCUMENTS

2009/0241590 A1* 10/2009 Eom ...................... F25D 25/025
62/449
2010/0219781 A1* 9/2010 Kuwamura ............. H02P 27/08
318/400.04

FOREIGN PATENT DOCUMENTS

JP 2019-013121 A 1/2019

* cited by examiner

*Primary Examiner* — Cortez M Cook
(74) *Attorney, Agent, or Firm* — Pearne & Gordon LLP

(57) ABSTRACT

To provide a motor drive control device capable of determining the rotational direction of a motor using a simple configuration with a reduced number of lead wires from position sensors, and a method for controlling the motor drive control device. A control circuit unit of a motor drive control device includes a first comparator configured to compare the magnitudes of a first positive Hall signal and a first negative Hall signal output from a first Hall element, thereby generating a first position detection signal; a second comparator configured to compare the magnitudes of a second negative Hall signal output from a second Hall element and the first negative Hall signal, thereby generating a second position detection signal; and a rotational direction determination unit configured to compare the transitions of the first position detection signal and the second position detection signal, thereby determining the rotational direction of a motor.

9 Claims, 13 Drawing Sheets

| | RISE | FALL |
|---|---|---|
| CLOCKWISE ROTATION | 11 | 00 |
| COUNTERCLOCKWISE ROTATION | 10 | 01 |

| FIRST POSITION DETECTION SIGNAL S5 | SECOND POSITION DETECTION SIGNAL S6 | DETERMINATION OF ROTATIONAL DIRECTION |
|---|---|---|
| RISE | High | CLOCKWISE ROTATION |
| RISE | Low | COUNTERCLOCKWISE ROTATION |
| FALL | High | COUNTERCLOCKWISE ROTATION |
| FALL | Low | CLOCKWISE ROTATION |

PATTERN 1

| | RISE | FALL |
|---|---|---|
| CLOCKWISE ROTATION | 11 | 00 |
| COUNTERCLOCKWISE ROTATION | 10 | 01 |

PATTERN 2

| | RISE | FALL |
|---|---|---|
| CLOCKWISE ROTATION | 10 | 01 |
| COUNTERCLOCKWISE ROTATION | 11 | 00 |

IN CASE OF FORWARD ROTATION

IN CASE OF REVERSE ROTATION

IN CASE OF REVERSE ROTATION

IN CASE OF FORWARD ROTATION

MOTOR DRIVE CONTROL DEVICE AND METHOD FOR CONTROLLING THE SAME

CROSS REFERENCE TO RELATED APPLICATIONS

This application claims the benefit of Japanese Patent Application No. 2020-169234, filed Oct. 6, 2020, which is hereby incorporated by reference in its entirety.

BACKGROUND

Technical Field

The present disclosure relates to a motor drive control device and a method for controlling the same.

Background

Conventionally, as a method for determining the rotational direction of a polyphase motor with three phases, for example, several methods for determining the rotational direction using an induced voltage are known, such as a method for determining the rotational direction from an induced voltage generated in a winding during rotation of the motor, or a method for determining the rotational direction using a magnetic sensor and an induced voltage.

Japanese Patent Laid-Open No. 2019-13121 discloses a control device for sensorless brushless motor that is configured to estimate the position of a rotor by monitoring an induced voltage, and switch the energization phase based on the result of estimation of the position of the rotor. With a position sensorless scheme such as the one disclosed in Japanese Patent Laid-Open No. 2019-13121, it is possible to determine the rotational direction from an induced voltage when the motor is not energized or is energized in an accurate energization pattern, but it would be difficult to detect the zero-cross point and estimate the rotational direction from an induced voltage if the energization pattern does not coincide with the rotational direction when the motor is energized.

SUMMARY

Unlike the aforementioned method for determining the rotational direction using an induced voltage, using a position sensor can determine the rotational direction even when the energization pattern is disturbed. For example, it is possible to use two position sensors arranged along the rotational direction of the motor and determine the rotational direction by detecting as an electrical signal a change in a magnetic flux generated with the rotation of the motor.

As such position sensors, Hall elements can be used, for example. It is necessary to output electrical signals generated by each Hall element as positive and negative output signals to a control circuit via two lead wires from the Hall element, and generate a polarity signal for each of the two Hall elements using the control circuit.

As described above, to detect the rotational direction using two position sensors, it is necessary to input signals to a control circuit via at least four lead wires, which in turn can result in a complex configuration of the device.

The present disclosure is related to providing a motor drive control device capable of determining the rotational direction of a motor using a simple configuration with a reduced number of lead wires from position sensors, and a method for controlling the motor drive control device.

A motor drive control device according to an embodiment includes a motor drive unit configured to drive a motor; and a control circuit unit configured to output a drive control signal to the motor drive unit, in which the control circuit unit includes a first comparison element configured to compare the magnitudes of a positive output signal and a negative output signal output from a first Hall element, thereby generating a first polarity signal, the first Hall element being provided at a first position where a change in a magnetic flux generated with the rotation of the motor is detectable, a second comparison element configured to compare the magnitudes of a positive or negative output signal output from a second Hall element and a comparison signal for a target to be compared, thereby generating a second polarity signal, the second Hall element being provided at a second position where a change in a magnetic flux generated with the rotation of the motor is detectable, and a rotational direction determination unit configured to compare the transitions of the first polarity signal and the second polarity signal, thereby determining a rotational direction of the motor.

DETAILED DESCRIPTION

1. Summary of Embodiment

Figure 1:
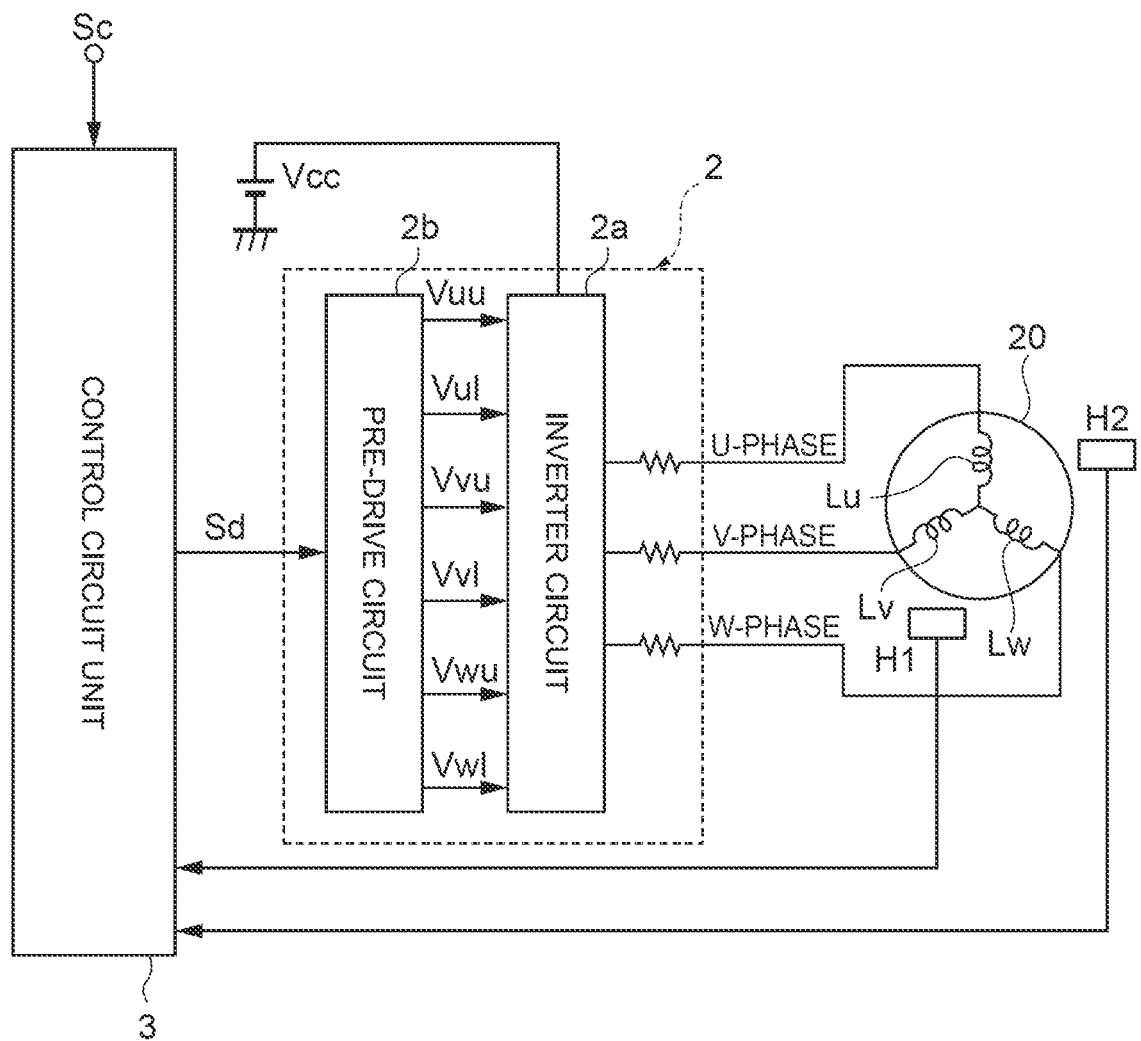
FIG. 1 is a diagram illustrating the general circuit configuration of a motor drive control device 1 of a first embodiment.

First, a summary of a representative embodiment of the disclosure of the present application will be described. In the following description, reference signs on the drawings corresponding to the components of the disclosure are indicated in parentheses, for example.

[1] A motor drive control device (1) according to a representative embodiment of the present disclosure includes a motor drive unit (2) configured to drive a motor (20); and a control circuit unit (3) configured to output a drive control signal (Sd) to the motor drive unit (2), in which the control circuit unit (3) includes a first comparison element (C1) configured to compare magnitudes of a positive output signal (H1$^+$) and a negative output signal (H1$^-$) output from a first Hall element (H1), thereby generating a first polarity signal (S5), the first Hall element (H1) being provided at a first position where a change in a magnetic flux generated with a rotation of the motor (20) is detectable, a second comparison element (C2) configured to compare a magnitude of a positive or negative output signal (H2$^-$) output from a second Hall element (H2) and a magnitude of a comparison signal for a target to be compared, thereby generating a second polarity signal (S6), the second Hall element (H2) being provided at a second position where a change in a magnetic flux generated with a rotation of the motor (20) is detectable, and a rotational direction determination unit (37) configured to compare a transition of the first polarity signal (S5) and a transition of the second polarity signal (S6), thereby determining a rotational direction of the motor.

[2] The motor drive control device according to [1] above, in which the rotational direction determination unit may be configured to, when a polarity of one of the first polarity signal and the second polarity signal has changed, determine the rotational direction of the motor based on a result of comparison between a direction of the change in the polarity of the one of the first polarity signal and the second polarity signal and a polarity of another polarity signal at the change.

[3] The motor drive control device according to [2] above, in which the second comparison element may use as the comparison signal the positive output signal or the negative output signal output from the first Hall element.

[4] The motor drive control device according to [2] above, in which the second comparison element may use as the comparison signal a signal with a predetermined reference voltage.

[5] The motor drive control device according to [3] above, wherein the rotational direction determination unit may be configured to determine that rotation of the motor is forward rotation if the second polarity signal has a second polarity at a timing when the polarity of the first polarity signal changes from a first polarity to the second polarity and also if the second polarity signal has the first polarity at a timing when the polarity of the first polarity signal changes from the second polarity to the first polarity, and determine that rotation of the motor is reverse rotation if the second polarity signal has the first polarity at a timing when the polarity of the first polarity signal changes from the first polarity to the second polarity and also if the second polarity signal has the second polarity at a timing when the polarity of the first polarity signal changes from the second polarity to the first polarity.

[6] The motor drive control device according to [3] above, in which the rotational direction determination unit may be configured to determine that rotation of the motor is forward rotation if the second polarity signal has a first polarity at a timing when the polarity of the first polarity signal changes from a second polarity to the first polarity and also if the second polarity signal has the second polarity at a timing when the polarity of the first polarity signal changes from the first polarity to the second polarity, and determine that rotation of the motor is reverse rotation if the second polarity signal has the second polarity at a timing when the polarity of the first polarity signal changes from the second polarity to the first polarity and also if the second polarity signal has the first polarity at a timing when the polarity of the first polarity signal changes from the first polarity to the second polarity.

[7] The motor drive control device according to [4] above, in which the rotational direction determination unit may be configured to determine that rotation of the motor is forward rotation if the first polarity signal has a second polarity at a timing when the polarity of the second polarity signal changes from the second polarity to a first polarity and also if the first polarity signal has the first polarity at a timing when the polarity of the second polarity signal changes from the first polarity to the second polarity, and determine that rotation of the motor is reverse rotation if the second polarity signal has the first polarity at a timing when the polarity of the second polarity signal changes from the second polarity to the first polarity and also if the first polarity signal has the second polarity at a timing when the polarity of the second polarity signal changes from the first polarity to the second polarity.

[8] The motor drive control device according to [1] above, in which the rotational direction determination unit may be configured to determine the rotational direction of the motor based on a timing when a polarity of the second polarity signal changes within half a period of a change in the first polarity signal.

[9] A method for controlling a motor drive control device according to a representative embodiment of the present disclosure is a method for controlling a motor drive control device, the motor drive control device including a motor drive unit configured to drive a motor, and a control circuit unit configured to output a drive control signal to the motor drive unit, the method including a first comparison step of comparing a magnitude of a positive output signal and a magnitude of a negative output signal output from a first Hall element, thereby generating a first polarity signal, the first Hall element being provided at a first position where a change in a magnetic flux generated with a rotation of the motor is detectable; a second comparison step of comparing a magnitude of a positive or negative output signal output from a second Hall element and a magnitude of a comparison signal for a target to be compared, thereby generating a second polarity signal, the second Hall element being provided at a second position where a change in a magnetic flux generated with a rotation of the motor is detectable; and a rotational direction determination step of comparing a transition of the first polarity signal and a transition of the second polarity signal, thereby determining a rotational direction of the motor.

2. Specific Examples of Embodiments

Hereinafter, specific examples of embodiments of the present disclosure will be described with reference to the accompanying drawings. In the following description, components common to each embodiment are denoted by identical reference signs, and repeated description of such components will be omitted.

First Embodiment

First, a motor drive control device and a method for controlling the motor drive control device according to a first embodiment will be described.

FIG. 1 is a diagram illustrating the general circuit configuration of a motor drive control device 1 of the first embodiment.

The motor drive control device 1 drives a motor 20. In the present embodiment, the motor 20 is a three-phase brushless motor, for example. The motor drive control device 1 rotates the motor 20 by periodically flowing a drive current through armature coils Lu, Lv, and Lw of the motor 20.

The motor drive control device 1 includes a motor drive unit 2, a control circuit unit 3, a first Hall element H1, and a second Hall element H2 (hereinafter, H1 and H2 may also be simply referred to as Hall elements). It should be noted that the components of the motor drive control device 1 illustrated in FIG. 1 are only some of all the components. Thus, the motor drive control device 1 may include other components in addition to those illustrated in FIG. 1.

In the present embodiment, the motor drive control device 1 is an integrated circuit device (IC) with some of circuits (for example, the control circuit unit 3 and a pre-drive circuit 2b described below) packaged. It should be noted that all of the circuits in the motor drive control device 1 may be packaged as a single integrated circuit device, or some or all of the circuits in the motor drive control device 1 may be packaged together with another device to form a single integrated circuit device.

The motor drive unit 2 includes an inverter circuit 2a and the pre-drive circuit 2b. The motor drive unit 2 drives the motor 20 by outputting drive signals to the motor 20 based on a drive control signal Sd output from the control circuit unit 3.

The pre-drive circuit 2b generates output signals for driving the inverter circuit 2a and outputs the signals to the inverter circuit 2a under the control of the control circuit unit 3. The inverter circuit 2a outputs drive signals to the motor 20 based on the output signals output from the pre-drive circuit 2b, and energizes the armature coils Lu, Lv, and Lw of the motor 20. The inverter circuit 2a is configured such that a pair of series circuits of two switching elements provided at opposite ends of a DC power supply Vcc is arranged for each of the phases (i.e., U-phase, V-phase, and W-phase) of the armature coils Lu, Lv, and Lw, for example. A terminal (not illustrated) of each phase of the motor 20 is connected to a connection node between the two switching elements of each pair. The pre-drive circuit 2b outputs six types of signals Vuu, Vul, Vvu, Vvl, Vwu, and Vwl corresponding to the respective switching elements of the inverter circuit 2a, for example, as output signals based on the drive control signal Sd output from the control circuit unit 3 as described below. With such output signals output, the corresponding switching elements are turned on or off so that drive signals are output to the motor 20 and each phase of the motor 20 is supplied with power (not illustrated).

A speed command signal Sc is input to the control circuit unit 3 from the outside, for example. The speed command signal Sc is a signal related to the rotational speed of the motor 20. For example, the speed command signal Sc is a PWM (pulse width modulation) signal corresponding to a target rotational speed of the motor 20. That is, the speed command signal Sc is information corresponding to a target value of the rotational speed of the motor 20. It should be noted that a clock signal may be input as the speed command signal Sc.

The first Hall element H1 is provided at a first position where a change in a magnetic flux generated with the rotation of the motor 20 is detectable. The second Hall element H2 is provided at a second position where a change in a magnetic flux generated with the rotation of the motor 20 is detectable. That is, the first Hall element H1 and the second Hall element H2 are provided at different positions where a change in a magnetic flux generated with the rotation of the motor is detectable.

Figure 2:
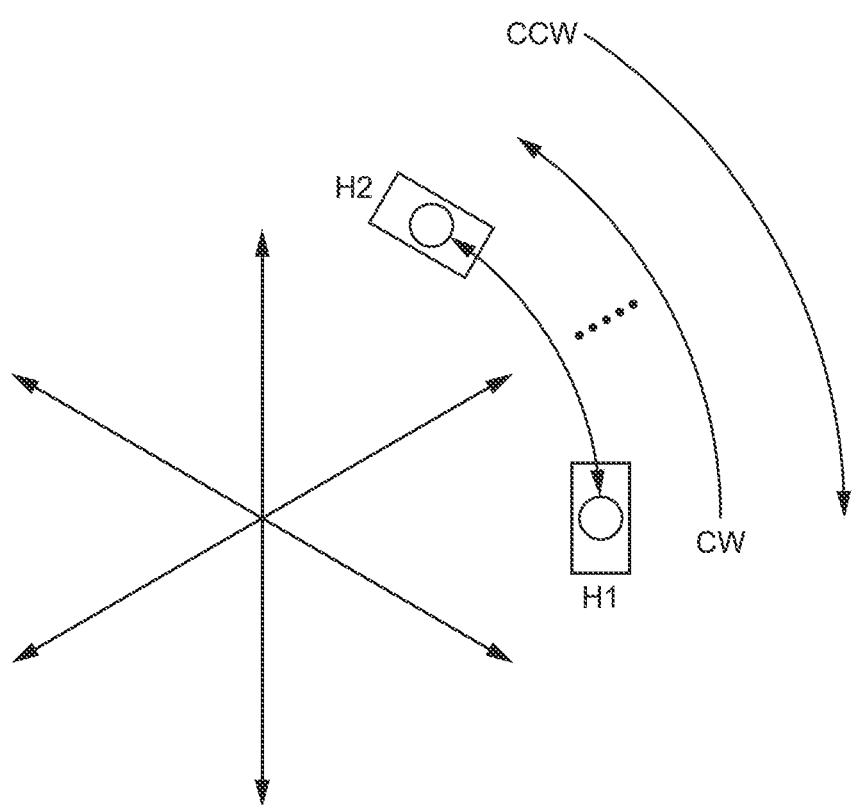
FIG. 2 is a view illustrating the arrangement of two Hall elements in the motor drive control device.

FIG. 2 is a view illustrating the arrangement of the two Hall elements H1 and H2 in the motor drive control device 1 of the present embodiment.

In the motor drive control device 1 of the present embodiment, the two Hall elements H1 and H2 are arranged at positions away from each other in the circumferential direction around a rotor of the motor 20 having 6 slots. The first Hall element H1 is arranged at a given position (i.e., the first position) where a change in a magnetic flux generated with the rotation of the motor 20 is detectable, and the second Hall element H2 is arranged at a position (i.e., the second position) with a mechanical angle of 60 degrees from the first position in the direction of forward rotation (CW) of the motor 20. Since the motor 20 has 6 slots, the first Hall element H1 and the second Hall element H2 have an electrical angle of 120 degrees from each other. The first Hall element H1 detects a magnetic pole of the rotor (not illustrated) and outputs a first positive Hall signal (which is an example of a positive output signal) $H1^+$ and a first negative Hall signal (which is an example of a negative output signal) $H1^-$. The second Hall element H2 detects a magnetic pole of the rotor (not illustrated) and outputs a second negative Hall signal (which is an example of a negative output signal) $H2^-$ (hereinafter, $H1^+$, $H1^-$, and $H2^-$ may also be simply referred to as Hall signals).

Referring back to FIG. 1, in the present embodiment, the control circuit unit 3 receives the three Hall signals $H1^+$, $H1^-$, and $H2^-$ from the Hall elements H1 and H2 provided around the motor 20. The control circuit unit 3 obtains actual rotational speed information, which is related to the actual rotational speed of the rotor of the motor 20, and rotational position information, using the Hall signals $H1^+$, $H1^-$, and $H2^-$ The control circuit unit 3 includes a microcomputer and a digital circuit, for example. The control circuit unit 3 outputs the drive control signal Sd to the motor drive unit 2 (i.e., the pre-drive circuit 2b) based on the first positive Hall signal H1+ and the first negative Hall signal H1− received from the first Hall element H1, the second negative Hall signal H2− received from the second Hall element H2, and the speed command signal Sc received from the outside.

The control circuit unit 3 outputs the drive control signal Sd to control the rotation of the motor 20 so that the motor 20 rotates at the rotational speed corresponding to the speed command signal Sc. That is, the control circuit unit 3 outputs the drive control signal Sd for driving the motor 20 to the motor drive unit 2, and controls the rotation of the motor 20.

Figure 3:
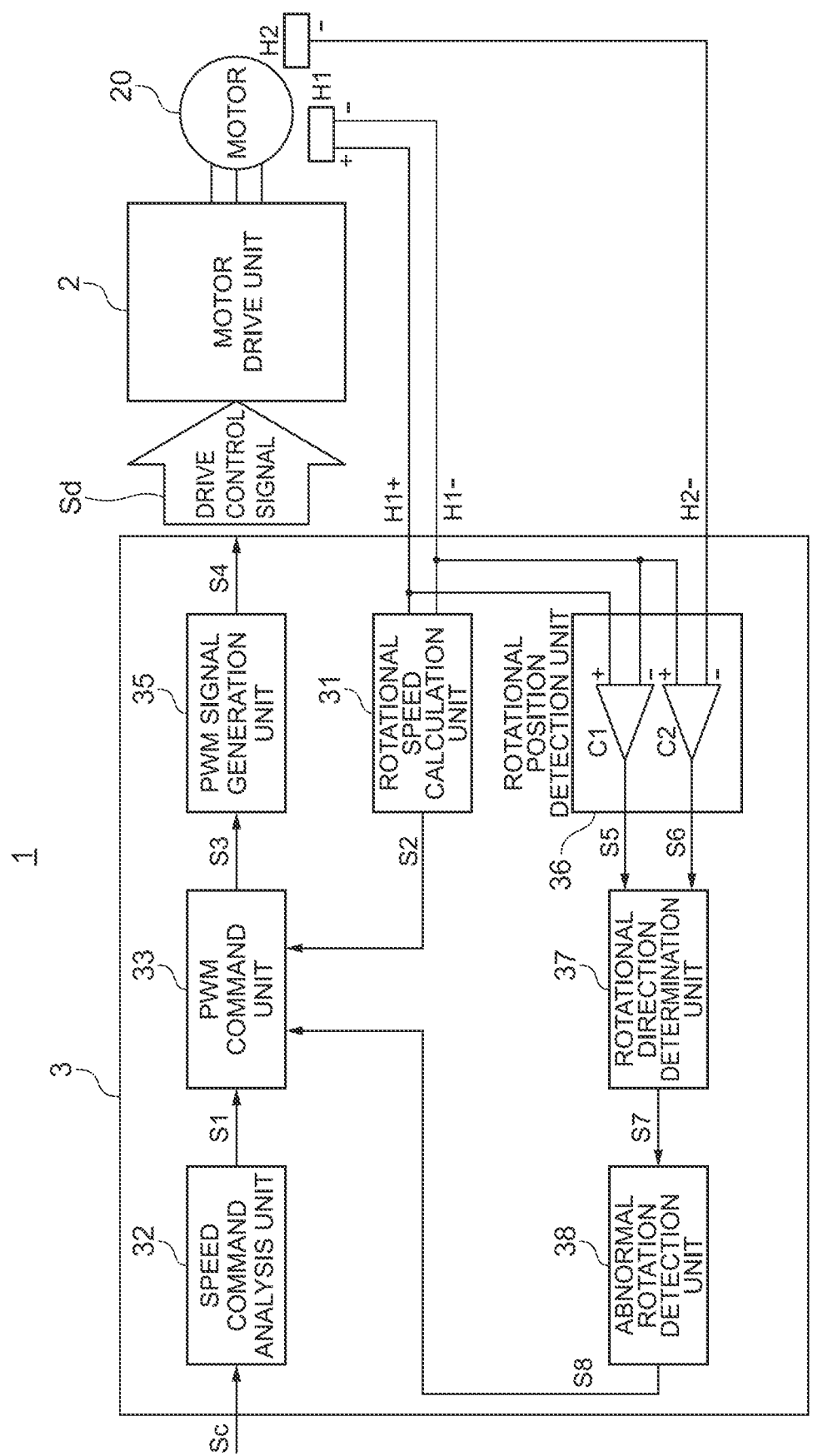
FIG. 3 is a block diagram illustrating the configuration of a control circuit unit 3 of the first embodiment.

FIG. 3 is a block diagram illustrating the configuration of the control circuit unit 3.

The control circuit unit 3 has hardware components including a processor, such as a CPU, various memories, such as ROM and RAM, a timer (i.e., a counter), an A/D converter circuit, an input/output I/F circuit, and a clock generation circuit, for example, and is configured as a program processing unit (for example, a microcontroller: MCU) having such components connected to each other via buses or dedicated lines.

In the control circuit unit 3, the processor implements the configurations of the functional units illustrated in FIG. 3 by performing various operations in accordance with programs stored in a storage device (not illustrated), such as a memory, and controlling the peripheral circuits, such as the A/D converter circuit and the input/output I/F circuit. That is, as illustrated in FIG. 3, the control circuit unit 3 includes, as the functional units, a rotational speed calculation unit 31, a speed command analysis unit 32, a PWM command unit 33, a PWM signal generation unit 35, a rotational position detection unit 36, a rotational direction determination unit 37, and an abnormal rotation detection unit 38.

The rotational speed calculation unit 31 receives the Hall signals H1+ and H1− from the first Hall element H1. The rotational speed calculation unit 31 outputs a position signal indicating the positional relationship between the phase in which the first Hall element H1 is provided and the rotor based on the received Hall signals H1+ and H1−. In addition, the rotational speed calculation unit 31 generates the actual rotational speed information corresponding to the period of the position signal based on the Hall signals H1+ and H1− and outputs the information. That is, the rotational speed calculation unit 31 outputs the actual rotational speed information related to the actual rotational speed of the rotor of the motor 20. In FIG. 3, the position signal and the actual rotational speed information are collectively indicated by an actual rotation signal S2. The actual rotation signal S2 is output to the PWM command unit 33.

The speed command analysis unit 32 receives the speed command signal Sc. The speed command analysis unit 32 outputs a target-rotational speed signal S1 (hereinafter also simply referred to as a target rotational speed S1) indicating the target rotational speed of the motor 20 based on the speed command signal Sc. The target rotational speed S1 is a PWM signal indicating the duty cycle corresponding to the speed command signal Sc. The target rotational speed S1 is output to the PWM command unit 33.

The PWM command unit 33 receives the actual rotation signal S2 output from the rotational speed calculation unit 31, and the target rotational speed S1 corresponding to the speed command signal Sc output from the speed command analysis unit 32. The PWM command unit 33 outputs a PWM setting command signal S3 based on the actual rotation signal S2, that is, the position signal and the actual rotational speed information, and the target rotational speed S1. The PWM setting command signal S3 is information indicating the duty cycle for outputting the drive control signal Sd. The PWM setting command signal S3 is output to the PWM signal generation unit 35.

The PWM command unit 33 compares the target rotational speed S1 with the actual rotational speed information corresponding to the rotational speed of the motor 20, and generates the PWM setting command signal S3 to allow the rotational speed of the motor 20 to correspond to the target rotational speed S1.

The PWM signal generation unit 35 receives the PWM setting command signal S3. The PWM signal generation unit 35 generates a PWM signal S4 for driving the motor drive unit 2 based on the PWM setting command signal S3. The PWM signal S4 is a signal with a duty cycle identical to the duty cycle indicated by the PWM setting command signal S3, for example. That is, the PWM signal S4 is a signal with a duty cycle corresponding to the duty cycle indicated by the PWM setting command signal S3.

The PWM signal S4 output from the PWM signal generation unit 35 is output as the drive control signal Sd from the control circuit unit 3 to the motor drive unit 2. Accordingly, the drive signal is output from the motor drive unit 2 to the motor 20 so that the motor 20 is driven.

The rotational position detection unit 36, upon receiving the Hall signals H1+, H1−, and H2− output from the two Hall elements (i.e., the first and second Hall elements) H1 and H2 arranged around the motor 20, generates a signal from which the rotational position is detectable. Specifically, since the first positive Hall signal H1+ and the first negative Hall signal H1− received from the first Hall element H1 and the second negative Hall signal H2− received from the second Hall element H2 each indicate a change in a magnetic flux generated with the rotation of the motor 20, the rotational position of the motor 20 can be detected by processing such signals. In the present embodiment, a first position detection signal S5 (which is an example of a first polarity signal) obtained by comparing the value of the first positive Hall signal H1+ with the value of the first negative Hall signal H1−, and a second position detection signal S6 (which is an example of a second polarity signal) obtained by comparing the inverted value of the first negative Hall signal H1− (which is an example of a comparison signal for a target to be compared) with the value of the second negative Hall signal H2− are output as signals from which the rotational position is detectable.

The rotational position detection unit 36 includes two comparators C1 and C2 (which are examples of a first comparison element and a second comparison element) as illustrated in FIG. 3, for example. The rotational position detection unit 36 compares the values of the Hall signals H1+ and H1− input to the first comparator C1, and outputs the result of comparison as the first position detection signal S5. Likewise, the rotational position detection unit 36 compares the values of the Hall signals H1− and H2− input to the second comparator C2, and outputs the result of comparison as the second position detection signal S6.

The rotational direction determination unit 37 compares the transition of the first position detection signal S5 with the transition of the second position detection signal S6, thereby determining the rotational direction of the motor 20. Specifically, the rotational direction determination unit 37 determines if the rotational direction of the motor 20 is forward rotation (CW) or reverse rotation (CCW) based on the first position detection signal S5 and the second position detection signal S6 each indicating the rotational position output from the rotational position detection unit 36, and outputs a determined-rotational-direction signal S7 to the abnormal rotation detection unit 38.

Figures 4A, 4B, 4C:
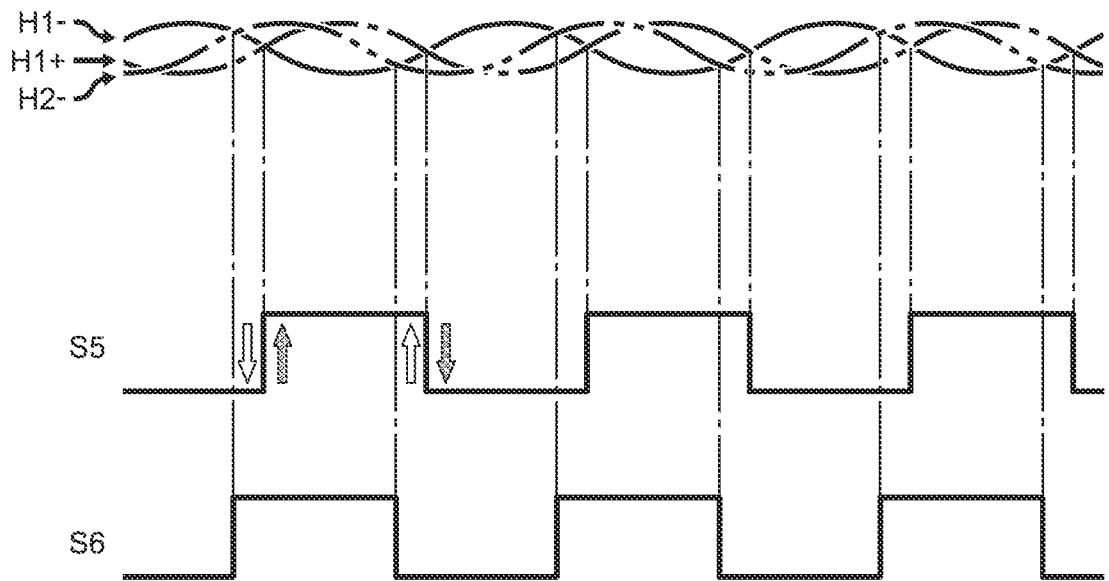
FIG. 4A is a signal waveform diagram for illustrating a method for determining if the rotation of a motor is forward rotation or reverse rotation according to the first embodiment.
FIG. 4B illustrates a determination condition of FIG. 4A for determining if the rotation of the motor is clockwise rotation or counterclockwise rotation.
FIG. 4C illustrates a further detailed determination condition of FIG. 4A.

FIG. 4 is a signal waveform diagram for illustrating a method for determining if the rotation of the motor is forward rotation or reverse rotation according to the first embodiment. Specifically, FIG. 4A illustrates the relationship between the waveforms of signals input to and output from the rotational position detection unit 36, FIG. 4B illustrates a determination condition for determining if the rotation of the motor is clockwise rotation (i.e., forward rotation) or counterclockwise rotation (i.e., reverse rotation) based on the signal waveforms of the first position detection signal S5 and the second position detection signal S6, and FIG. 4C illustrates a further detailed determination condition.

As illustrated in FIG. 4A, the first comparator C1 of the rotational position detection unit 36 compares the value of the first positive Hall signal H1$^+$ with the value of the first negative Hall signal H1$^-$, and outputs the result of comparison as the value of the first position detection signal S5, and the second comparator C2 compares the value obtained by inverting the first negative Hall signal H1$^-$ with the value of the second negative Hall signal H2$^-$, and outputs the result of comparison as the value of the second position detection signal S6. The rotational direction determination unit 37 analyzes the value of the second position detection signal S6 at the timing when the first position detection signal S5 has changed, based on the determination conditions illustrated in FIGS. 4B and 4C, and thus determines if the rotation of the motor 20 is forward rotation or reverse rotation. The signal waveforms illustrated in FIG. 4A change such that they progressively change from left to right on the sheet of drawings when the rotation of the motor 20 is forward rotation, and progressively change from right to left on the sheet of drawings when the rotation of the motor 20 is reverse rotation.

Figure 5:
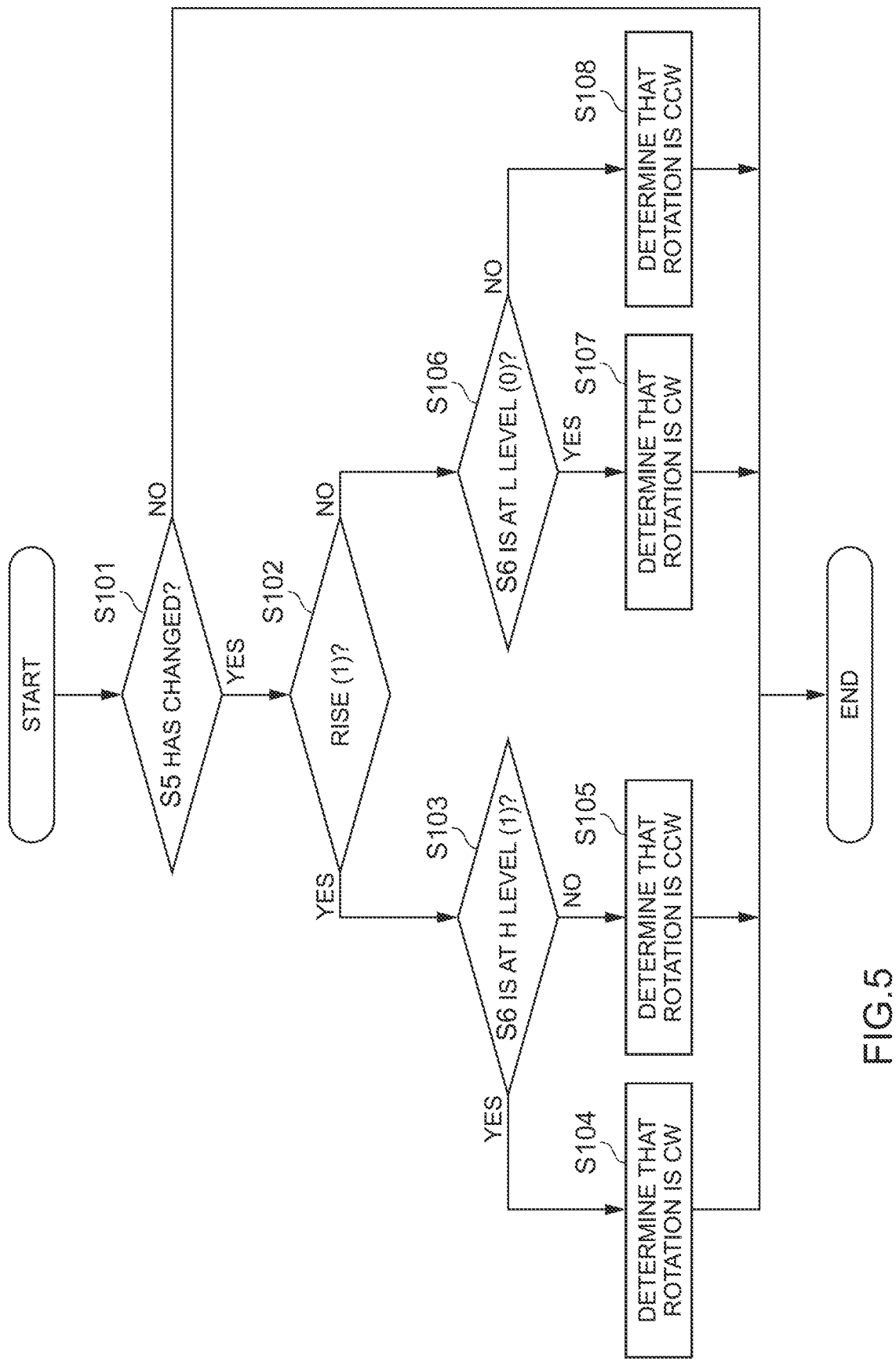
FIG. 5 is a flowchart illustrating exemplary procedures for determining the rotational direction according to the first embodiment.

FIG. 5 is a flowchart illustrating exemplary procedures for determining the rotational direction according to the first embodiment.

The rotational direction determination unit 37 first monitors the value of the first position detection signal S5, and determines if the value of the first position detection signal S5 has changed (step S101). If the rotational direction determination unit 37 determines that the value of the first position detection signal S5 has changed (step S101: YES), it determines if the change is a rise of the signal, that is, a change of the value from "0" (which is an example of the first polarity) to "1" (which is an example of the second polarity) (step S102). If the rotational direction determination unit 37 determines that the change in the first position detection signal S5 is a rise (step S102: YES), it determines if the value of the second position detection signal S6 is an H (High) level "1" (step S103).

If the rotational direction determination unit 37 determines that the value of the second position detection signal S6 is an H level "1" in step S103 (step S103: YES), it determines that the rotation of the motor 20 is forward rotation (CW) (step S104). Meanwhile, if the rotational direction determination unit 37 determines that the value of the second position detection signal S6 is not an H level "1" in step S103 (step S103: NO), it determines that the rotation of the motor 20 is reverse rotation (CCW) (step S105).

Similarly, if the rotational direction determination unit 37 determines that the change in the value of the first position detection signal S5 is not a rise (which means a fall) in step S102 (step S102: NO), it determines if the value of the second position detection signal S6 is an L (Low) level "0" (step S106). If the rotational direction determination unit 37 determines that the value of the second position detection signal S6 is an L level "0" (step S106: YES), it determines that the rotation of the motor 20 is forward rotation (CW) (step S107). Meanwhile, if the rotational direction determination unit 37 determines that the value of the second position detection signal S6 is not an L level "0" (step S106: NO), it determines that the rotation of the motor 20 is reverse rotation (CCW) (step S108). It should be noted that if the value of the first position detection signal S5 has not changed in step S101 (step S101: NO), the determination of the rotational direction is not conducted, and the process ends.

The rotational direction determination unit 37 outputs the result of determination (i.e., forward rotation or reverse rotation) to the abnormal rotation detection unit 38 as the determined-rotational-direction signal S7.

The determination of the rotational direction by the rotational direction determination unit 37 may be conducted based on different determination conditions depending on the configurations of the two comparators C1 and C2 in the rotational position detection unit 36.

Figures 6A, 6B, 6C:
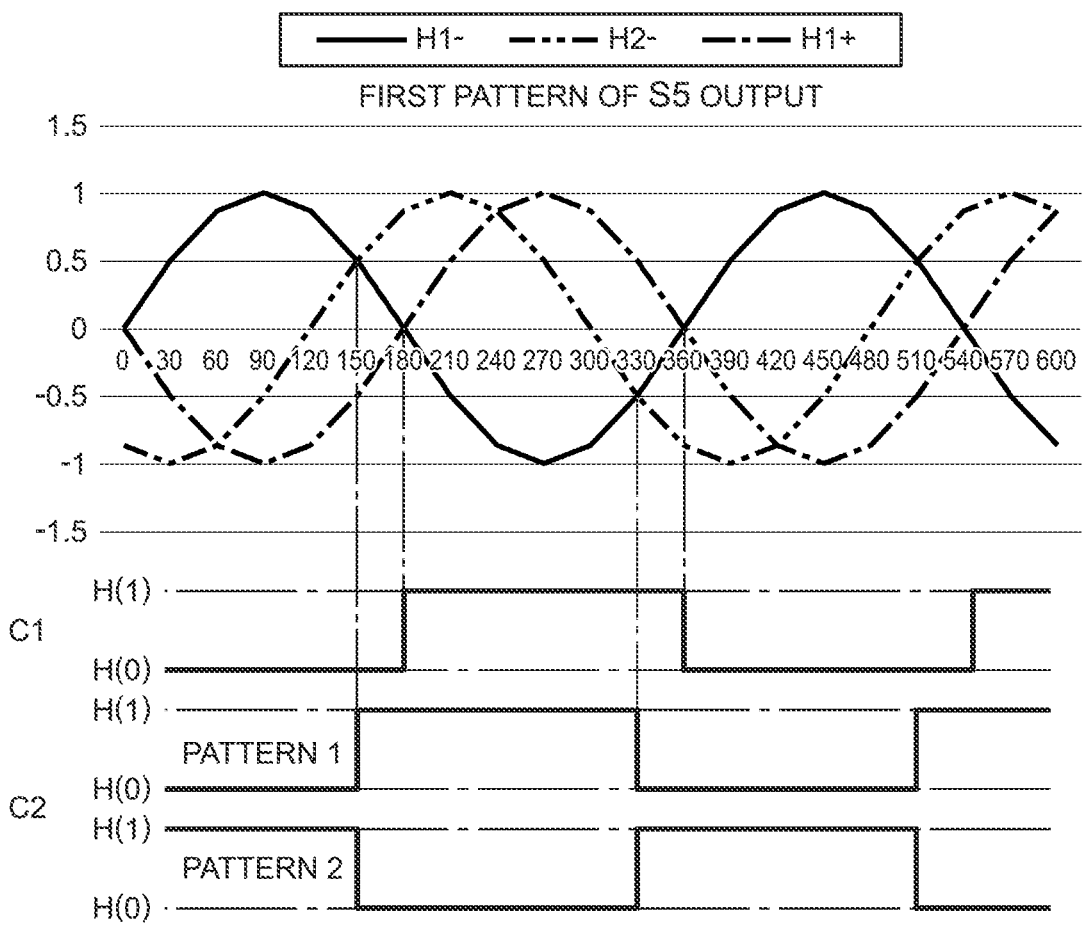
FIG. 6A is a diagram for illustrating a first pattern of the method for determining if the rotation of a motor is forward rotation or reverse rotation.
FIG. 6B illustrates a determination condition of Pattern 1 of FIG. 6A for determining if the rotation of the motor is clockwise rotation or counterclockwise rotation.
FIG. 6C illustrates a determination condition of Pattern 2 of FIG. 6A for determining if the rotation of the motor is clockwise rotation or counterclockwise rotation.
Figures 7A, 7B, 7C:
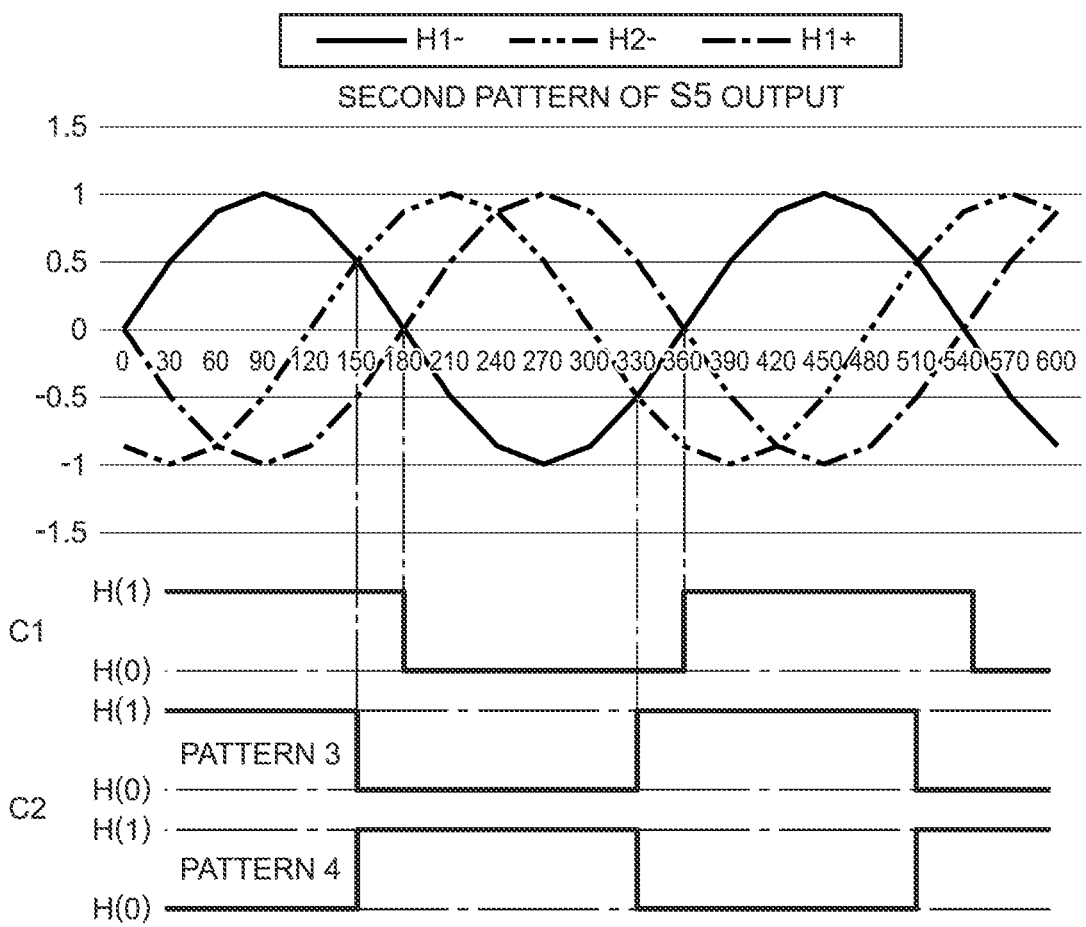
FIG. 7A is a diagram for illustrating a second pattern of the method for determining if the rotation of a motor is forward rotation or reverse rotation.
FIG. 7B illustrates a determination condition of Pattern 3 of FIG. 7A for determining if the rotation of the motor is clockwise rotation or counterclockwise rotation.
FIG. 7C illustrates a determination condition of Pattern 4 of FIG. 7A for determining if the rotation of the motor is clockwise rotation or counterclockwise rotation.

FIG. 6 is a diagram for illustrating a first pattern of the method for determining if the rotation of the motor is forward rotation or reverse rotation. FIG. 7 is a diagram for illustrating a second pattern of the method for determining if the rotation of the motor is forward rotation or reverse rotation. Specifically, FIGS. 6A and 7A each illustrate the relationship between the waveforms of signals input to and output from the rotational position detection unit 36 for each pattern, and FIGS. 6B, 6C, 7B, and 7C each illustrate a determination condition for determining if the rotation of the motor is clockwise rotation (i.e., forward rotation) or counterclockwise rotation (i.e., reverse rotation) based on the signal waveforms of the first position detection signal S5 and the second position detection signal S6.

The first pattern is a diagram illustrating a determination condition for the first comparator C1 that is configured such that the first position detection signal S5 is at L (0) level (i.e., low level) when H1$^-$>H1$^+$ and is at H (1) level (i.e., high level) when H1$^-$<H1$^+$. In such a case, the first pattern is further divided into a pattern 1 and a pattern 2 according to the configuration of the second comparator C2. The pattern 1 is a pattern in which the second position detection signal S6 of the second comparator C2 is at L (0) level when H1$^-$>H2$^-$ and is at H (1) level when H1$^-$<H2$^-$. To the contrary, the pattern 2 is a pattern in which the second position detection signal S6 of the second comparator C2 is at H (1) level when H1$^-$>H2$^-$ and is at L (0) level when H1$^-$<H2$^-$.

The second pattern is a diagram illustrating a determination condition for the first comparator C1 that is configured such that the first position detection signal S5 is at H (1) level when H1$^-$>H1$^+$ and is at L (0) level when H1$^-$<H1$^+$. In such a case, the second pattern is further divided into a pattern 3 and a pattern 4 according to the configuration of the second comparator C2. The pattern 3 is a pattern in which the second position detection signal S6 of the second comparator C2 is at H (1) level when H1$^-$>H2$^-$ and is at L (0) level when H1$^-$<H2$^-$. To the contrary, the pattern 4 is a pattern in which the second position detection signal S6 of the second comparator C2 is at L (0) level when H1$^-$>H2$^-$ and is at H (1) level when H1$^-$<H2$^-$.

As described above, the determination pattern varies depending on the configurations of the two comparators C1 and C2. The rotational direction determination unit 37 can determine the rotational direction by analyzing the values of the first and second position detection signals S5 and S6 based on the determination pattern.

The abnormal rotation detection unit 38 illustrated in FIG. 3, upon receiving the determined-rotational-direction signal S7 indicating the result of determination of the rotational direction (i.e., forward rotation or reverse rotation) from the rotational direction determination unit 37, determines if the result of determination corresponds to abnormal rotation. If the abnormal rotation detection unit 38 determines that the result of determination corresponds to abnormal rotation, it outputs an abnormal rotation detection signal S8 to the PWM command unit 33. The PWM command unit 33 can, upon receiving the abnormal rotation detection signal S8, issue a command to the PWM signal generation unit 35 to stop generation of a PWM signal as appropriate, for example.

As described above, according to the motor drive control device and the method for controlling the motor drive control device according to the present embodiment, it is possible to determine the rotational direction of the motor using a simple configuration with a reduced number of lead wires from the position sensors.

Second Embodiment

Next, a motor drive control device and a method for controlling the motor drive control device according to a second embodiment will be described.

Figure 8:
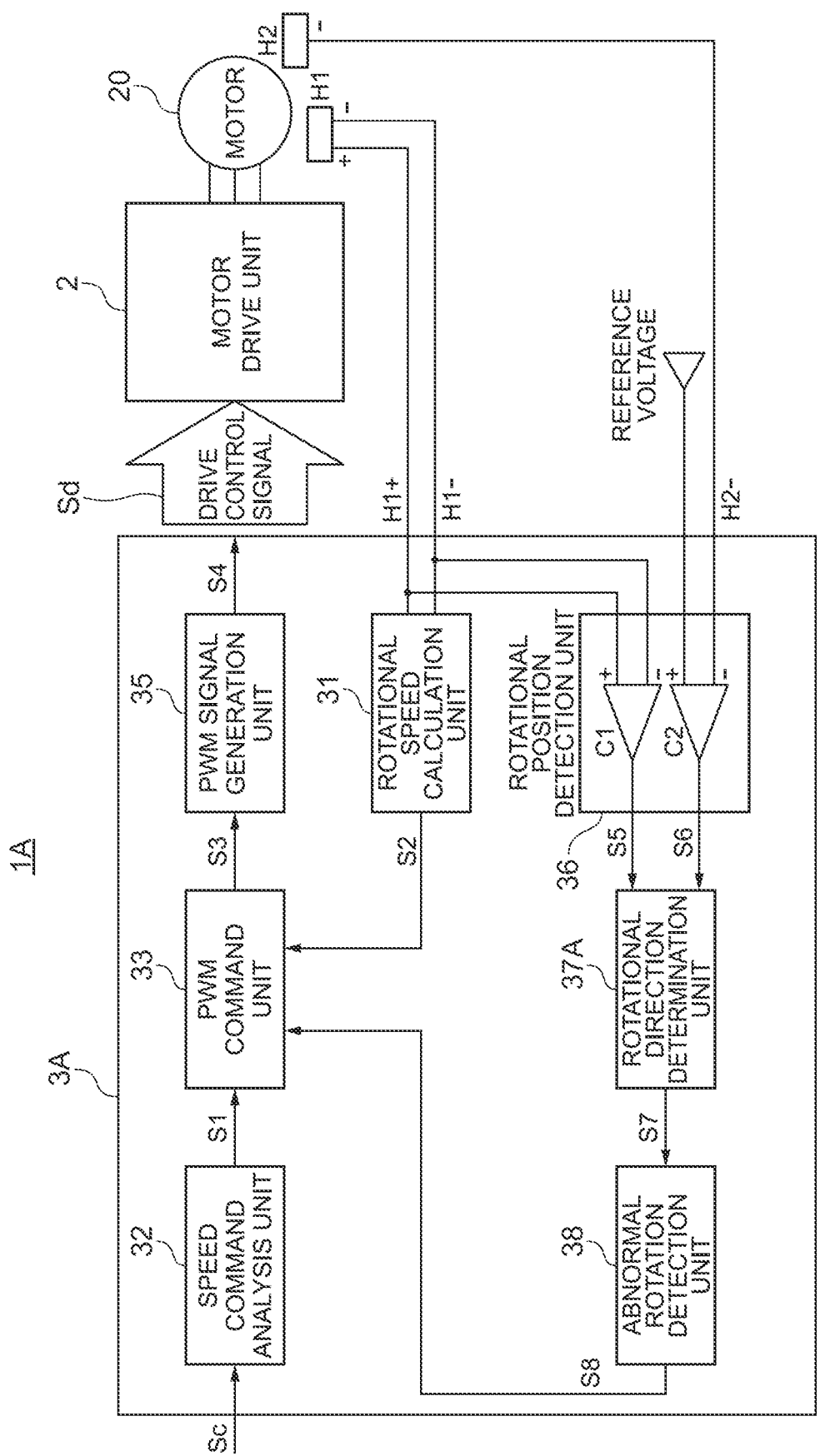
FIG. 8 is a block diagram illustrating the configuration of a control circuit unit 3 of a second embodiment.

FIG. 8 is a block diagram illustrating the configuration of a control circuit unit 3A of the second embodiment.

The motor drive control device 1 of the first embodiment is configured such that the Hall signals $H1^+$, $H1^-$, and $H2^-$ are input to the rotational position detection unit 36. In contrast, the configuration of a motor drive control device 1A of the present embodiment differs from the configuration of the motor drive control device 1 in that as illustrated in FIG. 8, a reference voltage with a predetermined potential (which is an example of a comparison signal for a target to be compared) is input to the rotational position detection unit 36 in addition to the Hall signals $H1^+$, $H1^-$, and $H2^-$. The motor drive control device 1A of the present embodiment also differs in that a rotational direction determination unit 37A determines the rotational direction of the motor by comparing the transition of the first position detection signal S5 and the transition of the second position detection signal S6 according to the input Hall signals $H1^+$, $H1^-$, and $H2^-$ and reference voltage, based on determination criteria different from those in the first embodiment. The other configurations are similar to those of the motor drive control device 1 and the method for controlling the motor drive control device 1 according to the first embodiment. Thus, repeated description of such configurations will be omitted.

Figure 9A:
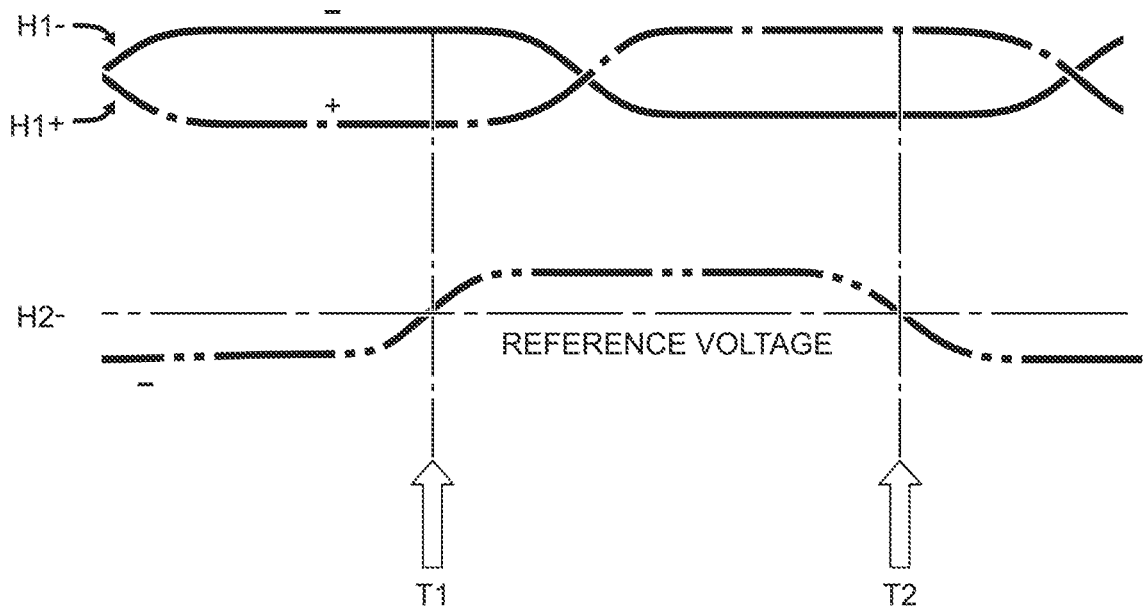
FIG. 9A is a diagram illustrating the relationship between the waveforms of signals input to a rotational position detection unit according to the second embodiment, in the case of forward rotation.
Figure 9B:
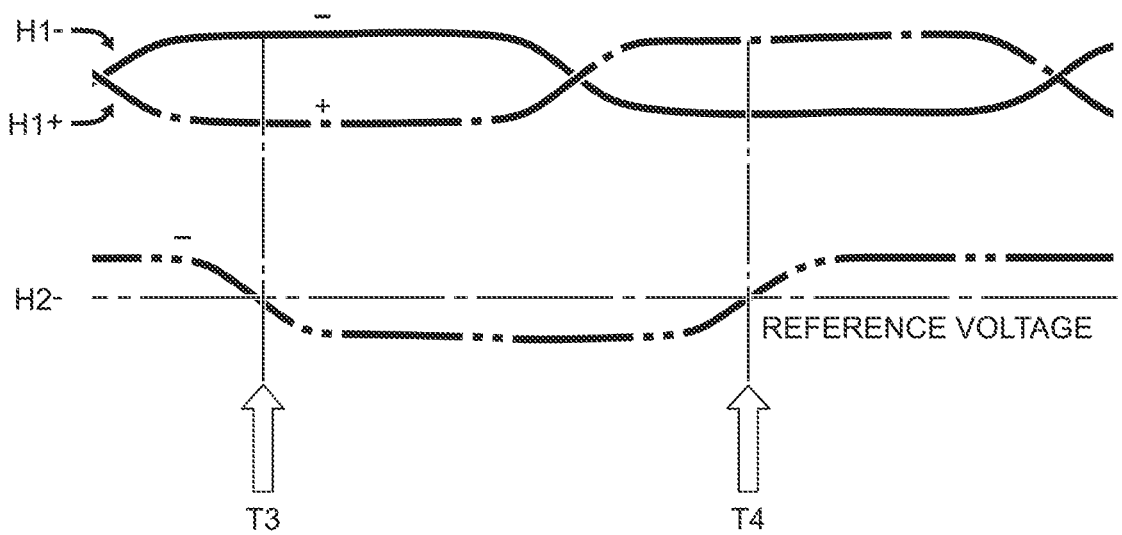
FIG. 9B is a diagram illustrating the relationship between the waveforms of signals input to a rotational position detection unit according to the second embodiment, in the case of reverse rotation.

FIG. 9 is a diagram illustrating the relationship between the waveforms of signals input to the rotational position detection unit 36 according to the second embodiment. Specifically, FIG. 9A illustrates the waveforms of input signals in the case of forward rotation, and FIG. 9B illustrates the waveforms of input signals in the case of reverse rotation.

Figure 10:
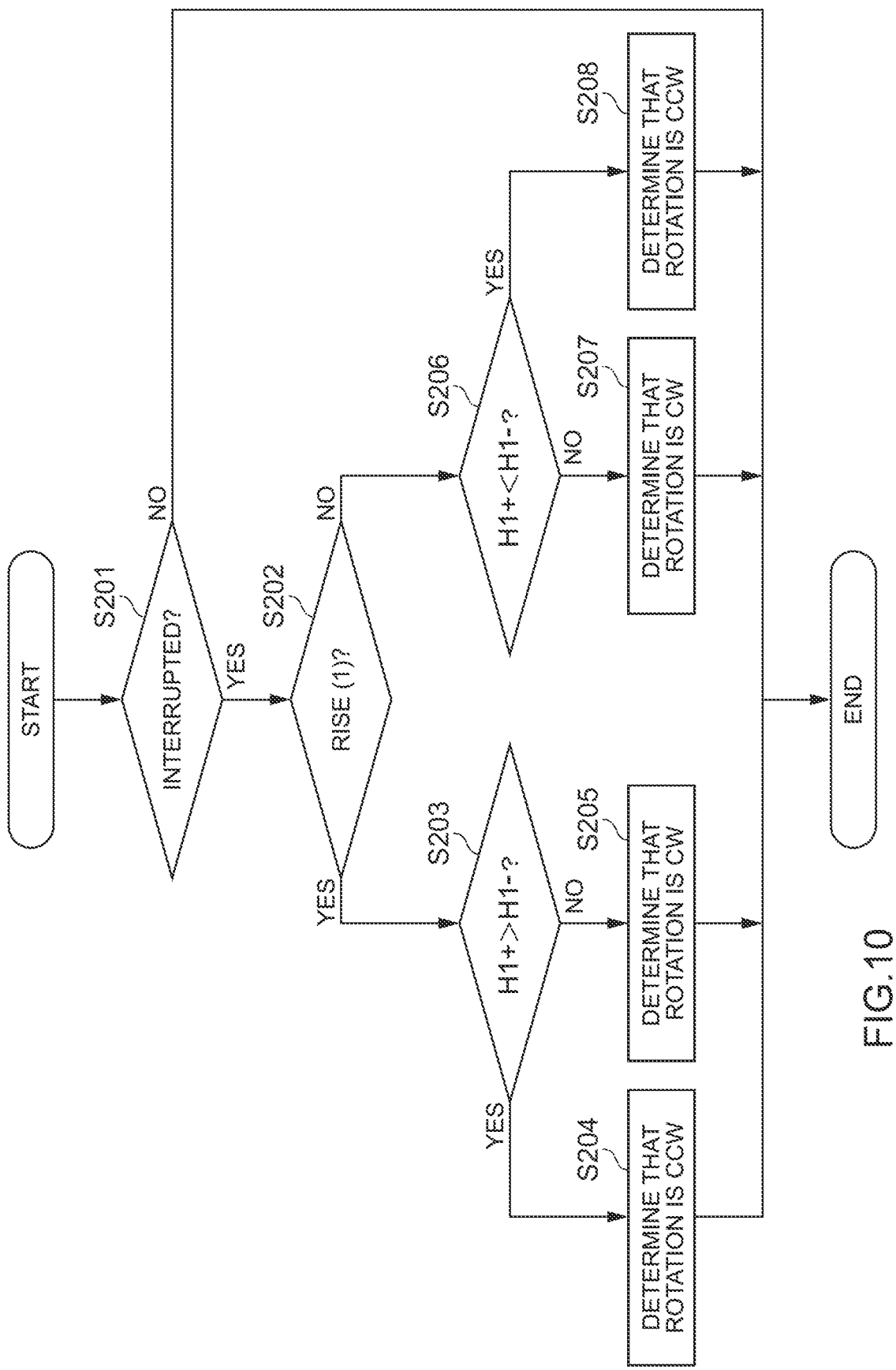
FIG. 10 is a flowchart illustrating exemplary procedures for determining the rotational direction according to the second embodiment.

FIG. 10 is a flowchart illustrating exemplary procedures for determining the rotational direction according to the second embodiment.

It should be noted that in the present embodiment, the first comparator C1 is configured such that the first position detection signal S5 is at H (1) level when $H1^->H1^+$ and is at L (0) level when $H1^-<H1^+$. Similarly, the second comparator C2 is configured such that the second position detection signal S6 is at H (1) level when $H2^->$(reference voltage) and is at L (0) level when $H2^-<$(reference voltage).

First, the operation of determining the rotational direction with the rotational direction determination unit 37A at a time point T1 in FIG. 9A will be described. The rotational direction determination unit 37A first determines if the second position detection signal S6 has been interrupted (step S201). Herein, the term "interrupted" means that the value of the second position detection signal S6 has changed. The rotational direction determination unit 37A determines that the signal was interrupted at the time point T1 (step S201: YES), and further determines if the signal has risen due to the interruption (step S202). Herein, since the level of the second position detection signal S6 changed from "0" to "1" at the time point T1, the rotational direction determination unit 37A determines that the signal has risen (step S202: YES), and then determines if the value of the first position detection signal S5 indicates that $H1^+>H1^-$ (step S203). If the value of the first position detection signal S5 at the time point T1 does not indicate that $H1^+>H1^-$ (step S203: NO), the rotational direction determination unit 37A determines that the rotation is forward rotation (CW) (step S205).

It should be noted that at a time point T4 in FIG. 9B, the rotational direction determination unit 37A performs determination similar to that at the time point T1 up to step S203. However, if the value of the first position detection signal S5 at the time point T4 indicates that $H1^+>H1^-$ in step S203 (step S203: YES), the rotational direction determination unit 37A determines that the rotation is reverse rotation (CCW) (step S204).

The operation of determining the rotational direction with the rotational direction determination unit 37A at a time point T3 in FIG. 9B will be described. The rotational direction determination unit 37A first determines that the second position detection signal S6 was interrupted at the time point T3 (step S201: YES), and further determines if the signal has risen due to the interruption (step S202). Herein, since the level of the second position detection signal S6 changed from "1" to "0" at the time point T3, the rotational direction determination unit 37A determines that the signal has not risen (step S202: NO), and then determines if the value of the first position detection signal S5 indicates that $H1^+<H1^-$ (step S206). If the value of the first position detection signal S5 indicates that $H1^+<H1^-$ at the time point T3 (step S206: YES), the rotational direction determination unit 37A determines that the rotation is reverse rotation (CCW) (step S208).

It should be noted that at a time point T2 in FIG. 9A, the rotational direction determination unit 37A performs determination similar to that at the time point T3 up to step S206. However, if the value of the first position detection signal S5 at the time point T2 does not indicate that $1^+<H1^-$ in step S206 (step S206: NO), the rotational direction determination unit 37A determines that the rotation is forward rotation (CW) (step S207).

With the motor drive control device 1A and the method for controlling the motor drive control device 1A according to the second embodiment, it is also possible to determine the rotational direction of the motor using a simple configuration with a reduced number of lead wires from the position sensors as in the first embodiment.

Third Embodiment

Next, a motor drive control device and a method for controlling the motor drive control device according to a third embodiment will be described.

Figure 11:
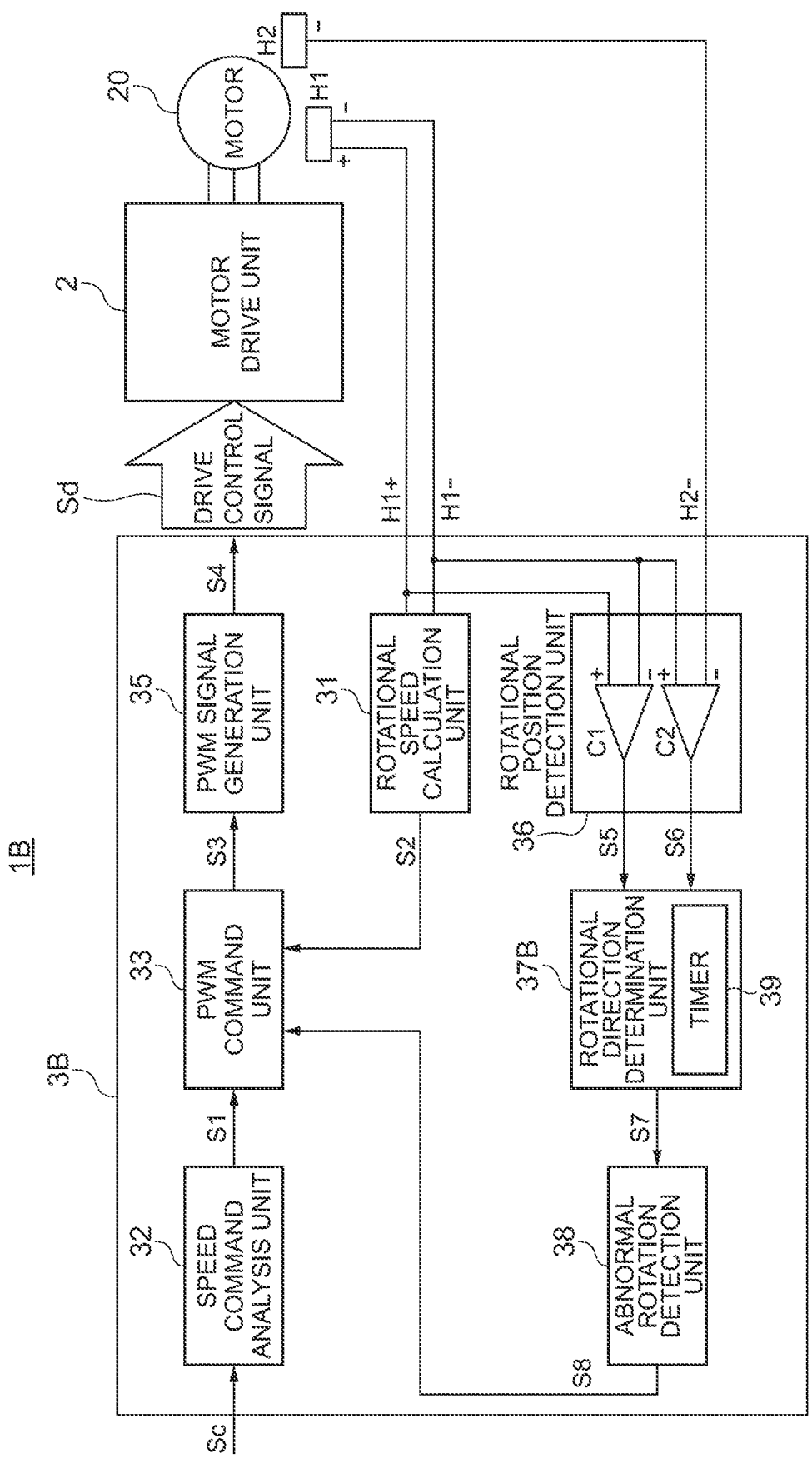
FIG. 11 is a block diagram illustrating the configuration of a control circuit unit 3 of a third embodiment.

FIG. 11 is a block diagram illustrating the configuration of a control circuit unit 3B of the third embodiment.

The motor drive control devices 1 and 1A of the aforementioned embodiments are configured such that when one of the outputs of the first position detection signal S5 and the second position detection signal S6 received by the rotational direction determination unit 37 or 37A from the rotational position detection unit 36 has changed, the rotational direction of the motor is determined based on a result of comparison between the direction of the change (i.e., whether the change is from "0" to "1" or from "1" to "0") and the output of the other of the position detection signals S5 and S6 (i.e., "0" or "1") at the change. In a motor drive control device 1B of the present embodiment, a rotational direction determination unit 37B compares the transition of the first position detection signal S5 with the transition of the second position detection signal S6 based on determination criteria different from those in the first and second embodiments. The rotational direction determination unit 37B is configured to determine the rotational direction of the motor based on the timing when the output of the second position detection signal S6 changes within half a period of a change in the first position detection signal S5. The other configurations are similar to those of the motor drive control device 1 and the method for controlling the motor drive control device 1 according to the first embodiment. Thus, repeated description of such configurations will be omitted.

Figure 12A:
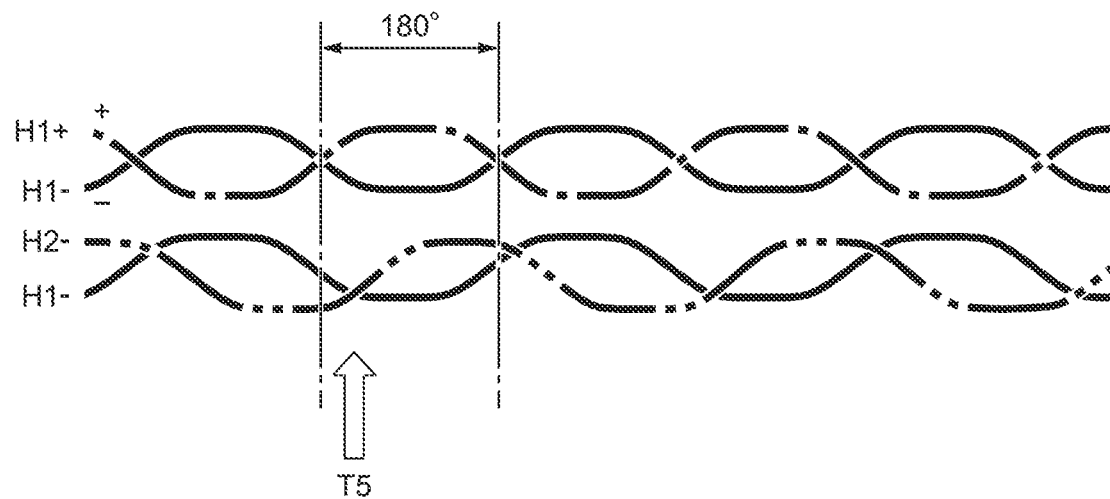
FIG. 12A is a signal waveform diagram for illustrating a method for determining if the rotation of a motor is forward rotation or reverse rotation according to the third embodiment, in the case of reverse rotation.
Figure 12B:
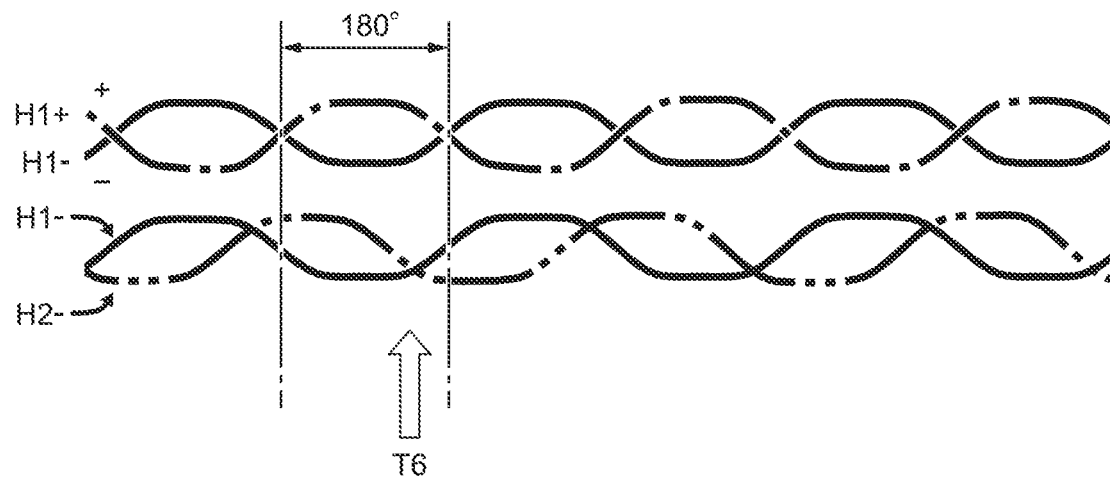
FIG. 12B is a signal waveform diagram for illustrating a method for determining if the rotation of a motor is forward rotation or reverse rotation according to the third embodiment, in the case of forward rotation.

FIG. 12 is a view illustrating the relationship between the waveforms of signals input to the rotational position detection unit 36. Specifically, FIG. 12A illustrates the waveforms of input signals in the case of reverse rotation, and FIG. 12B illustrates the waveforms of input signals in the case of forward rotation.

Figure 13:
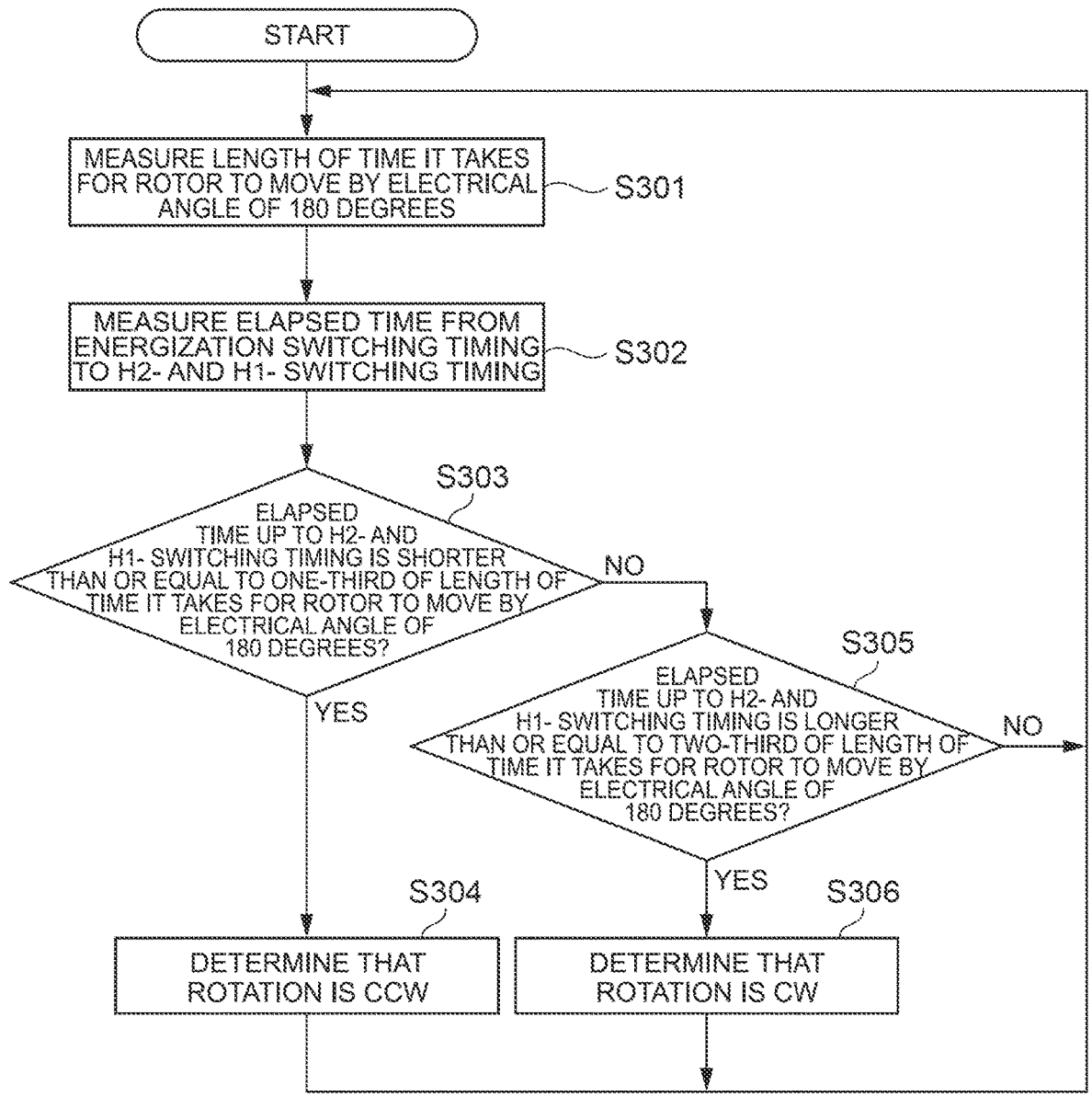
FIG. 13 is a flowchart illustrating exemplary procedures for determining the rotational direction according to the third embodiment.

FIG. 13 is a flowchart illustrating exemplary procedures for determining the rotational direction according to the third embodiment.

It should be noted that in the present embodiment, the first comparator C1 is configured such that the first position detection signal S5 is at H (1) level when H1⁻>H1⁺ and is at L (0) level when H1⁻<H1⁺. Similarly, the second comparator C2 is configured such that the comparison output S6 is at H (1) level when H2⁻>H1⁻, and is at L (0) level when H2⁻<H1⁻.

First, the operation of determining the rotational direction with the rotational direction determination unit 37B at a time point T5 in the case of reverse rotation of FIG. 12A will be described. The rotational direction determination unit 37B first measures the duration of half a period of the first position detection signal S5, that is, the duration for which the value of the first position detection signal S5 changes (i.e., the length of time it takes for the rotor to move by an electrical angle of 180 degrees), using a timer 39 (step S301). The rotational direction determination unit 37B stores the duration of half the period measured in step S301.

The rotational direction determination unit 37B measures the elapsed time from a time point when the first position detection signal S5 changed (i.e., energization switching timing) to the time point T5 when the second position detection signal S6 changed (i.e., H2⁻ and H1⁻ switching timing), using the timer 39 (step S302), and determines if the measured elapsed time up to the time point T5 is shorter than or equal to one-third of the duration of half the period (i.e., the length of time it takes for the rotor to move by an electrical angle of 180 degrees) stored in step S301 (which is an example of a determination condition) (step S303). In the example illustrated in FIG. 12A, the elapsed time from the time point when the first position detection signal S5 changed to the time point T5 is shorter than or equal to one-third of the duration of half the period (step S303: Yes). Thus, the rotational direction determination unit 37B determines that the rotation of the motor is reverse rotation (CCW) (step S304).

Next, the operation of determining the rotational direction with the rotational direction determination unit 37B at a time point T6 in the case of forward rotation of FIG. 12B will be described. In steps S301 and S302, processes similar to those described above are executed.

The rotational direction determination unit 37B measures the elapsed time from a time point when the first position detection signal S5 changed (i.e., energization switching timing) to the time point T6 when the second position detection signal S6 changed (i.e., H2⁻ and H1⁻ switching timing), using the timer 39 (step S302), and determines if the measured elapsed time up to the time point T6 is shorter than or equal to one-third of the duration of half the period (i.e., the length of time it takes for the rotor to move by an electrical angle of 180 degrees) stored in step S301 (which is an example of a determination condition) (step S303). In the example illustrated in FIG. 12A, the elapsed time from the time point when the first position detection signal S5 changed to the time point T6 is not shorter than or equal to one-third of the duration of half the period (step S303: No). Thus, the rotational direction determination unit 37B further determines if the elapsed time from the time point when the first position detection signal S5 changed to the time point T6 is longer than or equal to two-third of the duration of half the period (step S305). Since the elapsed time from the time point when the first position detection signal S5 changed to the time point T6 is longer than or equal to two-third of the duration of half the period (step S305: Yes), the rotational direction determination unit 37B can determine that the rotation is forward rotation (CW) (step S306).

With the motor drive control device and the method for controlling the motor drive control device according to the third embodiment, it is also possible to determine the rotational direction of the motor using a simple configuration with a reduced number of lead wires from position sensors as in the other embodiments.

MODIFIED EXAMPLE OF THE EMBODIMENTS

In the foregoing embodiments, the configuration of the motor drive control device is not limited to that illustrated in FIG. 1, and the configuration of the arrangement of the two Hall elements in the motor drive control device is not limited to that illustrated in FIG. 2. For example, although a three-phase brushless motor has been exemplarily described in the foregoing embodiments, the type of the motor is not limited to a particular type and the number of phases is not limited to a particular number. In addition, although the positions where the two Hall elements are arranged are not limited to particular positions, for example, the arrangement conditions for the Hall elements determine the waveforms of the first position detection signal S5 and the second position detection signal S6.

Further, the configuration of the control circuit unit is not limited to that illustrated in FIG. 3, 8, or 11.

In the foregoing embodiments, the process flow illustrated in each of FIGS. 5, 10, and 13 is only a specific example. Thus, the process flow is not limited to such flow. For example, different determination processes may be performed depending on determination conditions. In such a case, regarding the determination conditions in the second embodiment and the third embodiment, different determination conditions can be used by changing the configurations of the first comparator C1 and the second comparator C2 as with the determination conditions in the first embodiment. In addition, as the determination conditions in the third embodiment, it is also possible to use a proportion according to the arrangement conditions for the two Hall elements instead of determining if the measured elapsed time is shorter than or equal to one-third of the duration of half the period or determining if the measured elapsed time is longer than or equal to two-third of the duration of half the period.

What is claimed is:

1. A motor drive control device comprising:
a motor drive unit configured to drive a motor; and
a control circuit unit configured to output a drive control signal to the motor drive unit,
wherein:
the control circuit unit includes
a first comparison element configured to compare magnitudes of a positive output signal and a negative output signal output from a first Hall element, thereby generating a first polarity signal, the first Hall element being provided at a first position where a change in a magnetic flux generated with a rotation of the motor is detectable,
a second comparison element configured to compare a magnitude of a positive or negative output signal output from a second Hall element and a magnitude of a comparison signal for a target to be compared, thereby generating a second polarity signal, the second Hall element being provided at a second position where a change in a magnetic flux generated with a rotation of the motor is detectable, and
a rotational direction determination unit configured to compare a transition of the first polarity signal and a transition of the second polarity signal, thereby determining a rotational direction of the motor.

2. The motor drive control device according to claim 1, wherein the rotational direction determination unit is configured to, when a polarity of one of the first polarity signal and the second polarity signal has changed, determine the rotational direction of the motor based on a result of comparison between a direction of the change in the polarity of the one of the first polarity signal and the second polarity signal and a polarity of another polarity signal at the change.

3. The motor drive control device according to claim 2, wherein the second comparison element uses as the comparison signal the positive output signal or the negative output signal output from the first Hall element.

4. The motor drive control device according to claim 2, wherein the second comparison element uses as the comparison signal a signal with a predetermined reference voltage.

5. The motor drive control device according to claim 3, wherein the rotational direction determination unit is configured to
determine that rotation of the motor is forward rotation if the second polarity signal has a second polarity at a timing when the polarity of the first polarity signal changes from a first polarity to the second polarity and also if the second polarity signal has the first polarity at a timing when the polarity of the first polarity signal changes from the second polarity to the first polarity, and
determine that rotation of the motor is reverse rotation if the second polarity signal has the first polarity at a timing when the polarity of the first polarity signal changes from the first polarity to the second polarity and also if the second polarity signal has the second polarity at a timing when the polarity of the first polarity signal changes from the second polarity to the first polarity.

6. The motor drive control device according to claim 3, wherein the rotational direction determination unit is configured to
determine that rotation of the motor is forward rotation if the second polarity signal has a first polarity at a timing when the polarity of the first polarity signal changes from a second polarity to the first polarity and also if the second polarity signal has the second polarity at a timing when the polarity of the first polarity signal changes from the first polarity to the second polarity, and
determine that rotation of the motor is reverse rotation if the second polarity signal has the second polarity at a timing when the polarity of the first polarity signal changes from the second polarity to the first polarity and also if the second polarity signal has the first polarity at a timing when the polarity of the first polarity signal changes from the first polarity to the second polarity.

7. The motor drive control device according to claim 4, wherein the rotational direction determination unit is configured to
determine that rotation of the motor is forward rotation if the first polarity signal has a second polarity at a timing when the polarity of the second polarity signal changes from the second polarity to a first polarity and also if the first polarity signal has the first polarity at a timing when the polarity of the second polarity signal changes from the first polarity to the second polarity, and
determine that rotation of the motor is reverse rotation if the second polarity signal has the first polarity at a timing when the polarity of the second polarity signal changes from the second polarity to the first polarity and also if the first polarity signal has the second polarity at a timing when the polarity of the second polarity signal changes from the first polarity to the second polarity.

8. The motor drive control device according to claim 1, wherein the rotational direction determination unit is configured to determine the rotational direction of the motor based on a timing when a polarity of the second polarity signal changes within half a period of a change in the first polarity signal.

9. A method for controlling a motor drive control device, the motor drive control device including a motor drive unit configured to drive a motor, and a control circuit unit configured to output a drive control signal to the motor drive unit, the method comprising:
a first comparison step of comparing a magnitude of a positive output signal and a magnitude of a negative output signal output from a first Hall element, thereby generating a first polarity signal, the first Hall element being provided at a first position where a change in a magnetic flux generated with a rotation of the motor is detectable;
a second comparison step of comparing a magnitude of a positive or negative output signal output from a second Hall element and a magnitude of a comparison signal for a target to be compared, thereby generating a second polarity signal, the second Hall element being provided at a second position where a change in a magnetic flux generated with a rotation of the motor is detectable; and a rotational direction determination step of comparing a transition of the first polarity signal and a transition of the second polarity signal, thereby determining a rotational direction of the motor.

* * * * *